United States Patent Office 2,797,557
Patented July 2, 1957

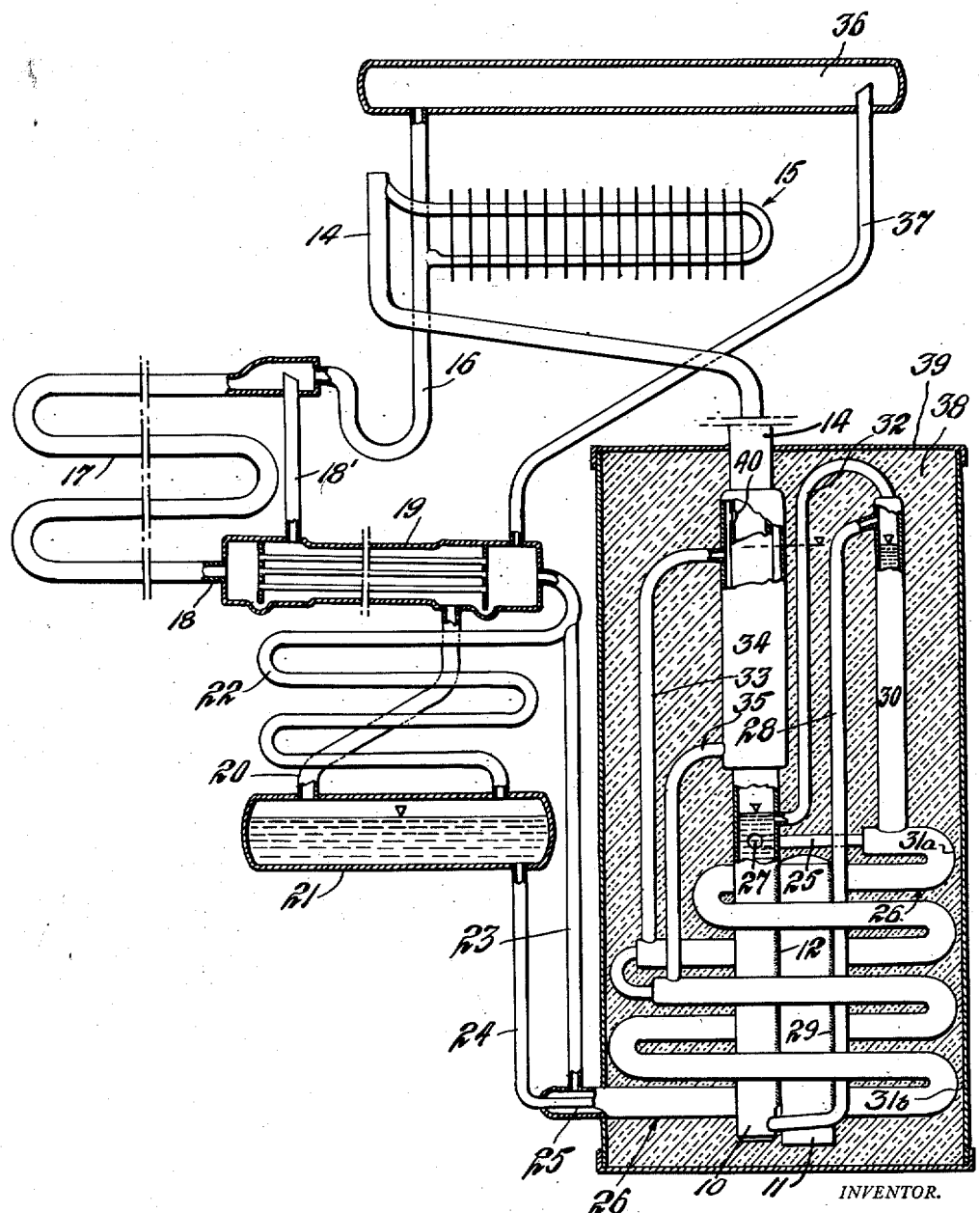

2,797,557
ABSORPTION REFRIGERATION APPARATUS

Wilhelm Georg Kogel, Stockholm, Sweden, assignor to Aktiebolaget Elektrolux, Stockholm, Sweden, a corporation of Sweden Continuation of application Serial No. 305,575, August 21, 1952. This application February 15, 1956, Serial No. 565,586

Claims priority, application Sweden September 22, 1951

2 Claims. (Cl. 62—119.5)

My invention relates to refrigeration systems of the absorption type and more particularly to such systems in which an inert gas or pressure equalizing agent is employed. This application is a continuation of my application Serial No. 305,575, filed August 21, 1952, now abandoned.

It is an object of my invention to effect improvements in the manner in which fluids are circulated in systems of this type, particularly to provide new arrangements for making use of heat from vapor generated in the vapor expulsion unit to promote heating of absorption liquid enriched in refrigerant and flowing to the vapor expulsion unit. More particularly, it is an object to provide such new arrangements for rectifying vapor generated in the vapor expulsion unit in which heat of rectification is effectively utilized to promote heating of absorption liquid weak in refrigerant and flowing from the vapor expulsion unit, and such heated weak absorption liquid is thereafter brought into heat exchange relation with rich absorption liquid flowing to the vapor expulsion unit. Further, it is an object to provide a heat exchanger for absorption liquid and a rectifier connected thereto which are arranged in a compact manner in the immediate vicinity of the vapor expulsion unit without the requirement or need of increasing the overall size of the unit to any appreciable extent by reason of the fact that provision is made for utilizing heat of rectification to boost the heat capacity of weak absorption liquid which in turn is given up to the rich absorption liquid in the liquid heat exchanger, so that the rich absorption liquid will enter the vapor expulsion unit at a higher temperature.

The novel features which I believe to be characteristic of my invention are set forth with particularity in the claims. The invention, both as to organization and method, together with the above and other objects and advantages thereof, will be better understood by reference to the following description taken in connection with the accompanying drawing forming a part of this specification, and of which the single figure more or less diagrammatically illustrates an absorption refrigeration system embodying the invention.

Referring to the drawing, I have shown my invention in connection with an absorption refrigeration system of a uniform pressure type which is well known in the art and in which an inert pressure equalizing gas is employed. Such a refrigeration system comprises a generator or vapor expulsion unit comprising a boiler 10 containing a refrigerant, such as ammonia, in solution in a body of absorption liquid, such as water. Heat is supplied to the boiler 10 from a heating tube 11 thermally connected therewith at 12, as by welding, for example. The heating tube 11 may be heated in any suitable manner, as by an electrical heating element disposed therein, for example.

The heat supplied to the boiler 10 and its contents expels refrigerant vapor out of solution, and, in a manner to be explained presently, the refrigerant vapor passes upwardly through a vapor supply line or conduit 14 into an air-cooled condenser 15 in which it is condensed and liquefied. Liquid refrigerant flows from condenser 15 through a conduit 16 into a cooling element 17 in which it evaporates and diffuses into an inert pressure equalizing gas, such as hydrogen, which enters through a conduit 18. Due to evaporation of refrigerant fluid into inert gas, a useful refrigerating effect is produced by cooling element 17 with consequent absorption of heat from thermally segregated surroundings.

The rich gas mixture of refrigerant vapor and inert gas formed in cooling element 17 flows from the upper part thereof through a conduit 18', a passage of gas heat exchanger 19, conduit 20 and absorber vessel 21 into the lower end of an absorber coil 22. In absorber coil 22 the rich gas mixture flows countercurrent to downwardly flowing absorption liquid which enters through a conduit 23. The absorption liquid absorbs refrigerant vapor from inert gas, and inert gas weak in refrigerant flows from absorber coil 22, another passage of gas heat exchanger 19 and conduit 18 into the lower end of cooling element 17.

The circulation of gas in the gas circuit just described is due to the difference in specific weight of the columns of gas rich and weak, respectively, in refrigerant vapor. Since the column of gas rich in refrigerant vapor and flowing from cooling element 17 to the absorber coil 22 is heavier than the gas weak in refrigerant and flowing from absorber coil 22 to cooling element 17, a force is produced or developed within the system for causing circulation of gas in the manner described.

Absorption solution enriched in refrigerant flows from the absorber vessel 21 through a conduit 24 and an inner pipe or passage 25 of a liquid heat exchanger unit 26. Rich absorption solution passes from the inner pipe 25 into the boiler 10 at a point 27 which is at a level below the liquid level in the absorber vessel 21 and below the surface level of the liquid column contained in the boiler. The boiler 10 comprises a vertically extending pipe which is closed at its lower end and to which is connected the lower end of a vapor lift tube 28 which is in thermal contact with the heating tube 11 at 29, as by welding, for example.

Liquid is raised through vapor lift tube 28 by vapor-liquid lift action to the upper part of a standpipe or riser 30 whose lower end is connected to the first section 31a of the outer passage or pipe of the liquid heat exchanger unit 26. The heating tube 11 in normal operation heats enriched absorption solution in the boiler 10 to cause expulsion of refrigerant vapor from solution. The principal part of generated vapor is expelled from solution in boiler 10, and liquid of decreasing refrigerant concentration flows downwardly to the bottom closed end thereof and into the lower end of lift tube 28. The vapor which passes from the upper end of vapor lift tube 28 into the vapor space of the standpipe 30 flows therefrom into a conduit 32 whose lower end is connected to the boiler 10 at a region which is below the liquid surface level therein. Vapor passing downwardly in conduit 32 depresses liquid therein so that the vapor bubbles through liquid in the upper part of boiler 10 which can be referred to as an analyzer. The absorption liquid entering the region of the analyzer at 27 is relatively rich in refrigerant and at a lower temperature than the generated vapor, and, in bubbling through the enriched absorption liquid, water vapor accompanying the refrigerant vapor is cooled sufficiently and condenses and in this way is removed from the refrigerant vapor. Refrigerant vapor generated and expelled from solution in boiler 10, together with vapor entering the upper part of the boiler through conduit 32, flows upwardly through the conduit or vapor supply line 14 to the condenser 15, as previously explained.

The absorption solution from which refrigerant vapor has been expelled flows from standpipe 30 through the first section 31a of the outer passage of the liquid heat exchanger unit 26, conduit 33, a vessel 34 in thermal exchange relation with vapor flowing from boiler 10 to condenser 15, conduit 35, the second section 31b of the outer pipe of the liquid heat exchanger unit 26 and conduit 23 into the upper part of absorber coil 22. The circulation of absorption liquid takes place by gravity from standpipe 30 to the upper part of absorber coil 22 and is effected by raising of liquid by vapor-liquid lift action in lift tube 28.

The outlet end of the condenser 15 is connected by an upper extension of conduit 16, vessel 36 and conduit 37 to the gas circuit, as at one end of gas heat exchanger 19, for example, so that any inert gas which may pass through the condenser 15 can flow into the gas circuit. Refrigerant vapor not liquefied in the condenser flows through the upper part of conduit 16 to displace inert gas in vessel 36 and force such gas into the gas circuit. The effect of forcing gas into the gas circuit in this manner is to raise the total pressure in the entire system, whereby an adequate condensing pressure is obtained to insure condensation of refrigerant vapor in condenser 15.

The boiler 10, heating tube 11, vapor lift tube 28, standpipe 30 and conduits connected to these parts constitute a generator or vapor expulsion unit. The vapor expulsion unit and liquid heat exchanger 26 are embedded in suitable insulating material 38 retained in an upright metal shell or casing 39. In the absorption liquid circuit in which circulation of absorption liquid is effected through and between boiler 10 and absorber coil 22, the liquid heat exchanger unit 26 interconnecting these parts serves to exchange heat between relatively cool rich absorption solution flowing from the absorber vessel 21 and relatively warm weak absorption liquid flowing from standpipe 30.

In refrigeration systems of the type just described, the heat capacity of the rich absorption liquid exceeds that of the weak absorption liquid. This will be readily apparent when it is realized that, with a definite quantity of weak absorption liquid flowing for a given time through one liquid heat exchanger passage toward the absorber coil 22 to absorb a definite quantity of refrigerant, the quantity of rich absorption liquid flowing in the same given time through the other liquid heat exchanger passage will exceed the quantity of weak absorption liquid by the quantity of refrigerant absorbed into solution in the absorber. Hence, when heat exchange is effected between all of the rich absorption liquid flowing from the absorber and all of the weak absorption liquid flowing from the vapor expulsion unit, the weak liquid by itself is not capable of heating the rich absorption liquid to the initial temperature of the weak liquid.

In order to boost the heat capacity of the weak absorption liquid, such liquid leaves standpipe 30 and initially flows through the first section 31a of the outer pipe of the liquid heat exchanger unit. After effectively giving up heat to rich absorption liquid flowing through the inner pipe 25 and about to enter the boiler 10, the partially cooled weak absorption liquid flows through conduit 33 into vessel 34 and is brought into thermal exchange relation with vapor generated in the vapor expulsion unit and flowing through the upper part of boiler pipe 10 to the vapor supply line 14.

The vapor generated in the vapor expulsion unit usually is a mixture of refrigerant vapor and absorption liquid vapor. When ammonia and water are employed as the refrigerant and absorption liquid, for example, the generated vapor usually is a mixture of ammonia vapor and water vapor. The latent heat of condensation resulting from condensation of water vapor is referred to as heat of rectification which is utilized to promote heating of weak absorption liquid in vessel 34. Essentially, the vessel 34 and the piping enveloped by the vessel, through which vapor is conducted to the vapor supply line 14, constitute a liquid cooled rectifier in which heat of rectification is given up to weak absorption liquid. The heated weak absorption liquid is then conducted through conduit 35 to the second section 31b of the outer pipe of the liquid heat exchanger unit, the additional heat capacity imparted thereto enabling such weak absorption liquid to promote effective heating of rich absorption liquid flowing into the inner pipe 25 of the liquid heat exchanger unit from the absorber vessel 21.

In accordance with my invention, the liquid heat exchanger unit 26 is in the immediate vicinity of the vapor expulsion unit to form a compact assembly of parts; and the rectifier 34 and conduits 33 and 35 connected to the first and second outer pipe sections 31a and 31b, respectively, are all at a lower level than the condenser 15 and completely enveloped in the same body of insulation 38 utilized to insulate the vapor expulsion unit from the surroundings. Further, the compact assembly of parts is retained by employing as the rectifier 34 a jacket which is disposed about the upper part of boiler pipe 10 at a region between the free liquid surface level maintained in the absorber vessel 21 and the liquid level maintained in the upper part of standpipe 30 by the vapor lift tube or pump 28. The condensate formed in the liquid cooled rectifier flows downwardly by gravity into the boiler 10 and in this way is returned to the absorption liquid circuit in a path of flow which by-passes the condenser 15 and cooling element 17.

The weak absorption liquid entering the rectifier or vessel 34 through conduit 33 flows in thermal exchange relation with the generated vapor, the heat transfer being effected through the wall of the boiler pipe 10. In order to vent from the upper part of rectifier 34 vapor which may pass therein from conduit 33 and the second section 31b of the outer liquid heat exchanger passage, an opening 40 is provided in the upper part of the boiler pipe. It will be seen that the liquid levels in rectifier 34 and standpipe 30 are essentially the same and the opening 40 is at a higher level than that maintained in the vapor expulsion unit by the vapor lift pump 28.

The conduits 33 and 35 and vessel or jacket 34 form a conduit connection in the absorption liquid circuit which is segregated from the inert gas circuit for conducting weak absorption liquid from the first section 31a to the second section 31b of the outer passage of the liquid heat exchanger unit, the absorption liquid in such connection flowing in thermal exchange relation with vapor flowing through the piping which extends upwardly from the liquid holding part of the boiler 10.

The vent 40, which provides a vapor communication between the upper part of the aforementioned conduit connection, of which vessel 34 forms a part, constitutes the only provision for bringing weak absorption liquid in the conduit connection in intimate physical contact with gaseous fluid circulating in the apparatus.

In the drawing the parts embedded in the insulation 38 have been shown alongside one another to illustrate the invention as clearly as possible. In refrigeration apparatus constructed in accord with the invention, it will be understood that a compact assembly of parts is obtained by locating the vertically extending pipes and tubes in a cluster about the boiler pipe 10 and heating tube 12. Further, the liquid heat exchanger unit 26 may be of helical form or any other suitable shape and positioned closely adjacent to and in the immediate vicinity of the vapor expulsion unit.

Subject matter common to this application and to application Serial No. 305,574, filed August 21, 1952, and not being claimed herein, is being claimed in application Serial No. 305,574.

While a single embodiment of the invention has been

What is claimed is:

1. In absorption refrigeration apparatus having circuits for circulation of refrigerant, inert gas and absorption liquid, the circuit for circulation of absorption liquid including an absorber, liquid heat exchanger means and a generator comprising a boiler, means for heating said boiler, said liquid heat exchanger means having one passage for conducting absorption liquid rich in refrigerant from said absorber to said generator and another passage for conducting absorption liquid weak in refrigerant from said generator to said absorber, a vapor supply line including vertically extending piping communicating with said boiler for flowing vapor therefrom, said other liquid heat exchanger passage having first and second sections for conducting weak absorption liquid successively therethrough, conduit means segregated from the inert gas circuit for conducting weak absorption liquid from the first section of said other liquid heat exchanger passage into thermal relation with vapor flowing through said piping and then to the second section of said other liquid heat exchanger passage for flow therethrough, said conduit means including a jacket disposed about said piping for bringing the weak absorption liquid in thermal exchange relation with vapor in said piping, and said piping having an opening for venting vapor from the interior of said jacket into said piping, said vent opening constituting the only provision for bringing weak absorption liquid in said conduit means in intimate physical contact with gaseous fluid circulating in the apparatus.

2. In absorption refrigeration apparatus having circuits for circulation of refrigerant, inert gas and absorption liquid, the circuit for circulation of absorption liquid including an absorber, liquid heat exchanger means and a generator comprising a boiler and a vapor lift pump, said absorption liquid circuit including connections for maintaining the liquid surfaces in said boiler and said absorber at essentially the same level, means for heating said boiler and pump, said liquid heat exchanger means having one passage for conducting absorption ilquid rich in refrigerant from said absorber to said generator and another passage for conducting absorption liquid weak in refrigerant from said generator to said absorber, a vapor supply line including vertically extending piping communicating with said boiler for flowing vapor therefrom, said other liquid heat exchanger passage having first and second sections for conducting weak absorption liquid successively therethrough, conduit means segregated from the inert gas circuit for conducting weak absorption liquid from the first section of said other liquid heat exchanger passage into thermal exchange relation with vapor flowing through said piping and then to the second section of said other liquid heat exchanger passage for flow therethrough, said conduit means including a jacket disposed about said piping for bringing the weak absorption liquid in thermal exchange relation with vapor at a region of said piping which extends vertically between the liquid surface level in said boiler and the liquid level maintained in said generator by said pump, and said piping having an opening for venting vapor from the interior of said jacket into said piping, said vent opening constituting the only provision for bringing weak absorption liquid in said conduit means in intimate physical contact with gaseous fluid circulating in the apparatus.

References Cited in the file of this patent
UNITED STATES PATENTS

| | | |
|---|---|---|
| 2,201,362 | Bergholm | May 21, 1940 |
| 2,203,074 | Anderson | June 4, 1940 |
| 2,215,674 | Ullstrand | Sept. 24, 1940 |
| 2,278,661 | Lenning | Apr. 7, 1942 |
| 2,284,691 | Strandberg | June 2, 1942 |
| 2,538,010 | Kogel | Jan. 16, 1951 |

UNITED STATES PATENT OFFICE

CERTIFICATE OF CORRECTION

Patent No. 2,797,557 July 2, 1957

Wilhelm Georg Kogel

It is hereby certified that error appears in the printed specification of the above numbered patent requiring correction and that the said Letters Patent should read as corrected below.

Column 5, line 23, after "thermal" insert -- exchange --.

Signed and sealed this 13th day of August 1957.

(SEAL)
Attest:

KARL H. AXLINE
Attesting Officer

ROBERT C. WATSON
Commissioner of Patents